United States Patent [19]

Fair et al.

[11] 4,406,327

[45] Sep. 27, 1983

[54] CHEMICALLY-AIDED GAS CAP DRIVE

[75] Inventors: Walter B. Fair, Slidell, La.; Edwin A. Richardson, Houston, Tex.

[73] Assignee: Shell Oil Company, Houston, Tex.

[21] Appl. No.: 354,874

[22] Filed: Mar. 4, 1982

[51] Int. Cl.$^3$ ............................................. E21B 43/22
[52] U.S. Cl. .................................................. 166/300
[58] Field of Search ............... 166/268, 270, 300, 302, 166/305 R

[56] References Cited

U.S. PATENT DOCUMENTS

| Re. 30,935 | 5/1982 | Richardson et al. | 166/300 |
| 4,178,993 | 12/1979 | Richardson et al. | 166/305 R X |
| 4,205,723 | 6/1980 | Clauset, Jr. | 166/305 R X |
| 4,219,083 | 8/1980 | Richardson et al. | 166/300 |
| 4,232,741 | 11/1980 | Richardson et al. | 166/305 R X |
| 4,265,309 | 5/1981 | Magnie | 166/305 R X |
| 4,330,037 | 5/1982 | Richardson et al. | 166/300 X |

OTHER PUBLICATIONS

Morrow, "Updip Oil Recovery by Downdip Gas Injection", *The Petroleum Engineer*, Apr. 1959, vol. 29, No. 4, pp. 28–32.

Bleakley, "Chevron's Attic-Oil Recovery South Louisiana Looks Good", *Oil and Gas Journal*, Nov. 13, 1967, pp. 132–134.

Strickland et al., "Gas Injection for Upstructure Oil Drainage", *Journal of Petroleum Technology*, Oct. 1979, pp. 1323–1331.

*Primary Examiner*—Stephen J. Novosad
*Assistant Examiner*—George A. Suchfield

[57] ABSTRACT

A recovery of attic oil, from a location within a subterranean reservoir between the top of the reservoir and the uppermost opening into a well encountering the reservoir, is improved by injecting fluid comprising or containing a nitrogen-gas-generating solution arranged to yield heat and gas within the reservoir, keeping the injected fluid static long enough for the reservoir to be heated and gas to migrate upward and then producing fluid in response to a gas cap drive.

7 Claims, No Drawings

CHEMICALLY-AIDED GAS CAP DRIVE

BACKGROUND OF THE INVENTION

This invention relates to producing "attic oil" from between the top of a subterranean reservoir and the uppermost opening into a well which encounters the reservoir. The invention utilizes a chemically-aided expanding gas cap drive.

Numerous reservoirs are tilted or curved so that oil and/or gas becomes trapped against a fluid-impermeable upper closure. Although such traps may contain significant amounts of attic oil, they are apt to be too small to be feasibly tapped by a well. In general, the oil below such an attic location can be produced by a conventional process such as a natural or artificial water or gas drive, a solution gas drive, or the like. In the absence of a water drive, when the pressure of any gas which is located above the uppermost opening into a production well becomes exhausted, the flow of attic oil simply stops. In the presence of a water drive, when the water reaches the producing location, the water-to-oil ratio of produced fluid becomes uneconomically high.

The following patents relate to prior attempts to produce attic oil and/or obviate or postpone the "water coning" which may increase the water-to-oil ratio of the produced fluid even before an upward advance of a static water level has reached the production location.

U.S. Pat. No. 2,258,614 suggests injecting oil or gas in order to depress a water cone with a liquid less dense than water, then producing fluid from the reservoir at a relatively slow rate.

U.S. Pat. No. 2,784,787 suggests treating a well in which the oil overlays water that might cone by injecting a slug of sealing fluid at the oil/water interface while simultaneously injecting non-sealing fluid into the oil layer to prevent any upflow of the sealing fluid.

U.S. Pat. No. 2,788,855 suggests injecting gas into the water layer to displace the water radially away from the well and then producing fluid from the well at a higher level.

U.S. Pat. No. 4,205,723 suggests preventing water coning while producing attic oil by injecting fluid which is gaseous at the reservoir temperature, injecting a water-excluding agent into the reservoir during or after allowing the gas to migrate to the top of the reservoir, and then resuming the production of fluid.

The commonly employed process for producing attic oil involves injecting enough gas to initiate or increase the energy of a gas cap drive and, after waiting for the gas to migrate to the top of the reservoir, resuming production. This may require an undesirably long waiting period and the duration of such a waiting period increases with increases in the viscosity of the reservoir oil.

In the course of research on other well treating problems, it was found that self-reactive aqueous solutions for generating nitrogen gas could be compounded and flowed into wells so that they generate the gas and heat at selected times and rates which are useful for various well treating operations.

U.S. Pat. No. 4,178,993 by E. A. Richardson and R. F. Scheuerman describes a well treating process for initiating fluid production from a liquid-containing well by injecting an aqueous solution containing nitrogen-gas-generating reactants having a concentration and rate of reaction correlated with the pressure and volume properties of the reservoir and the well. The reactants are arranged to be capable of reacting at a moderate rate while generating enough gas to displace enough liquid from the borehole to reduce the hydrostatic pressure to less than the fluid pressure within the reservoir.

U.S. Pat. No. 4,219,083 by E. A. Richardson and R. F. Scheuerman describes a process for backflushing well casing perforations by injecting an aqueous solution containing nitrogen-gas-generating reactants, an alkaline buffer for providing a reaction-retarding pH and an acid-yielding reactant for subsequently overriding the buffer and lowering the pH in order to trigger a fast-rising pulse of heat and pressure which causes a perforation-cleaning backsurge of fluid through the perforations.

U.S. Pat. No. 4,232,741 by E. A. Richardson, R. F. Scheuerman, D. C. Berkshire, J. Reisberg and J. H. Lybarger describes a process for temporarily plugging thief zones within a reservoir by injecting an aqueous solution containing nitrogen-gas-generating reactants, a foaming surfactant, an alkaline buffer for delaying and moderating the reaction and an acid-yielding reactant for subsequently reducing the pH, arranged so that they initially delay the reaction and subsequently initiate a moderate rate of gas production in order to form a foam which is, temporarily, relatively immobile within the reservoir formation.

Patent application Ser. No. 127,355 filed Mar. 5, 1980, now abandoned, by D. R. Davies and E. A. Richardson describes a process for conducting a production test by circulating a solution of nitrogen-gas-generating reactants through conduits within a well, buffering the solution at a pH providing a promptly-initiated reaction having a relatively mild rate of reaction, with the solution being inflowed at a rate such that the gas which it generates serves as a lift gas for gas-lifting fluid from the reservoir through another conduit within the well.

Patent application Ser. No. 215,895 filed Dec. 12, 1980, now U.S. Pat. No. 4,330,037, by E. A. Richardson and W. B. Fair, Jr. describes a process for treating an oil-containing reservoir, to chemically heat the reservoir and increase its effective mobility to oil, by injecting an aqueous solution of nitrogen gas-generating reactants with the solution having a volume, a rate of reaction and a heat-generating capability such that during its injection, the heat is generated below a selected depth and a selected volume of the reservoir is heated to a selected temperature.

Patent application Ser. No. 307,035 filed Sept. 30, 1981 by E. A. Richardson and W. B. Fair, Jr. describes a process for unplugging well casing perforations submerged under a relatively dense brine by injecting a relatively fast-reacting nitrogen-gas-generating solution arranged to have a density exceeding that of the brine, in the presence or absence of an oil solvent, so that the reactive solution sinks below the brine and the plugged perforations are heated and scrubbed by the gas-generating reaction.

The disclosures of the U.S. Pat. Nos. 4,178,933; 4,219,083 and 4,232,741 patents and patent applications Ser. Nos. 127,355, 215,895, and 307,305 are incorporated herein by cross-reference.

SUMMARY OF THE INVENTION

The present invention relates to producing oil from a location between the top of a subterranean reservoir and the uppermost opening into a well encountering the reservoir. Fluid which comprises or contains an aqueous solution of nitrogen-gas-generating reactants is injected into the reservoir. The composition and concentration of the reactants are arranged so that that solution is capable of generating significant amounts of nitrogen gas and heat at the reservoir temperature. The composition of the injected fluid is arranged so that the fluid becomes hot and predominantly gaseous at the temperature to which the reservoir is heated by the nitrogen-gas-generating reaction. The injected fluid is kept relatively static within the reservoir until a significant amount of nitrogen gas has been generated within the reservoir and at least some gas has migrated above the uppermost opening into the well. Fluid is then produced from the reservoir in response to a gas cap drive.

DESCRIPTION OF PREFERRED EMBODIMENTS

The present invention involves a discovery that it is both physically possible and economically attractive to treat an attic oil-containing reservoir by injecting fluid containing a nitrogen-gas-generating solution in order to initiate or enhance a gas cap drive. Where the reservoir oil is relatively viscous, the heat which is generated along with the gas significantly increases the rate and extent to which gas migrates toward the top of the reservoir, by thermally mobilizing the oil. Where the reservoir contains water, the inflow of the aqueous solution displaces the reservoir water and fills the spaces initially occupied by water with a solution which subsequently generates a gas in situ. This makes it feasible to displace significantly more of the reservoir water than could be displaced by an injection of a gas—even when the gas is injected at a high rate.

In the present process, the injected fluid can contain a nitrogen-gas-generating solution mixed with a gaseous fluid and/or a liquid which vaporizes at the reservoir pressure and the temperature which is developed in the reservoir during the generation of the nitrogen gas as long as that fluid is capable of becoming hot and predominantly gaseous at the temperature to which the reservor is heated by the nitrogen-gas-generating reaction. The injecting of such a mixture can, for example, supplement the volume of the nitrogen gas which is generated in situ by an injection of natural gas. Such a mixture can also aid the thermal mobilizing of the reservoir oil by adding the oil-diluting effect of, for example, the hydrocarbons which are vaporized from a mixture of liquefied petroleum gas.

In general, a reservoir to which the present invention is applicable can comprise substantially any which has a substantially gas-impermeable top, has a significant degree of vertical permeability, and contains attic oil. Such a reservoir can be one from which oil has been produced from structurally lower portions of the reservoir by means of natural gas-cap drive, solution drive, natural or artificial water drives, or the like. The present process is uniquely attractive with respect to an attic oil reservoir in which the oil viscosity and reservoir permeability properties are such that the rate of an upward migration of a gas such as methane is undesirably slow at the normal reservoir temperature.

Where a gas or a liquid which vaporizes (at the pressure and temperature resulting from the nitrogen-gas-generating reaction within the reservoir) is injected along with an aqueous solution of the nitrogen-gas-generating reactants, such a gas or liquid can comprise substantially any which becomes at least predominantly gaseous within the reservoir and is chemically inert with respect to the nitrogen-gas-generating reaction and reservoir oil. Example of such fluids include natural gas, nitrogen gas, enriched natural gas, hydrocarbons which are liquid or gaseous at ambient temperatures and are vaporous and miscible with the reservoir oil at temperatures and pressures resulting from the nitrogen-gas-generating reaction within the reservoir, flue gas, $CO_2$, air, and the like.

A staged injection involving at least two slugs of the nitrogen-gas-generating solution is preferred, particularly where it is desired to heat a relatively large volume of the reservoir and generate a significantly large volume of gas. In such an injection, a significant proportion of the first slug is displaced into the reservoir and, kept substantially static until it develops at least most of its heat relatively near the well. The reactive components in the next portion to be injected are arranged to be relatively inactive at the temperature within the borehole but mildly rapidly reactive at the temperature to which the reservoir is heated by the reaction of the first slug. The second slug is displaced through the rocks heated by the first slug. It reacts within that heated zone and its reaction products are kept hot until they have been displced farther into the reservoir.

Where slugs of normally gaseous fluid or vaporizable liquid are alternated with slugs of the nitrogen generating fluid, such gases or gasifiable fluids are, of course, heated and thus made more mobile and more active with respect to migrating upward and/or diffusing into the reservoir oil. Since the volume of the nitrogen gas which is generated within the reservoir is inversely proportional to the reservoir pressure, a mixture of a gas or vaporizable liquid with the nitrogen generating solution is beneficial in reducing the amount of reactants needed to introduce a significant volume of gas within a relatively high pressure reservoir. In general, it is desirable that the injected fluid include at least enough nitrogen-gas-generating reactants and/or gas or liquid which will vaporize at the temperature generated within the reservoir to provide a fluid which is or becomes predominantly gaseous before or soon after entering the reservoir. The composition of the injected fluid is preferably arranged so that within the reservoir most of its volume is gaseous and the liquid it contains is hotter than the normal reservoir temperature.

In a preferred embodiment, successive slugs of nitrogen generating reactants are injected while controlling the rate of their reaction relative to the natural reservoir temperature and controlling the rate at which the fluids are injected so that each slug of gas-generating solution generates the bulk of the heat and gas it is capable of generating while it is located within the reservoir. In another preferred embodiment, such slugs of nitrogen-generating solution are alternated with slugs of gaseous or gasifiable hydrocarbon. In another preferred embodiment, a sequence of slugs of relatively slowly-reacting nitrogen-gas-generating solution alternated with slugs of gaseous or gasifiable liquid are injected ahead of a slug of nitrogen-gas-generating solution which reacts substantially as soon as it enters the borehole of the well. Then, as described in the U.S. Pat. No. 4,178,993 patent, by shutting in the well after that substantially immediately reactive slug has entered the tubing string, the treating solutions ahead of it are displaced into the reservoir by the nitrogen gas generated within the tubing string. When an outflow of this gas is permitted (after allowing sufficient time for the preceding slugs to have generated substantially the desired amount of heat and gas and for a migration of the gas toward the top of the reservoir) the outflowing of the gas reduces the bottom hole pressure and induces an inflow of fluids produced from the reservoir. The extent of such a pressure reduction can be made fast or slow by controlling the rate at which the gas is allowed to flow out of the tubing string.

In general, after the injection into the reservoir of fluid comprising or containing an aqueous solution of the nitrogen-gas-generating reactants, the injected fluid is kept substantially static within the reservoir for a time sufficient for at least some nitrogen gas and heat to be generated within the reservoir and for at least some gas to migrate to a location above the uppermost opening through which fluid can be produced when the well is put on production. As will be apparent to those skilled in the art, the amount of time required for this is to some extent controllable by controlling the rate at which the nitrogen-gas-generating solutions react within the reservoir. It is also to some extent, controllable by the amount by which the nitrogen-gas-generating solutions increase the temperature of the reservoir, particularly where such an increase in temperature causes a significant increase in the mobility of the reservoir oil.

In general, the rate of an upward migration of gas is highly dependent upon uncontrollable reservoir parameters such as the distance by which the gas must rise above the point of injection in order to form or become a part of a gas cap and the extent of the effective vertical permeability of the reservoir to that gas. In this sense, the term "effective vertical permeability" refers to the effective permeability to the in situ-generated nitrogen, or its mixture with another gaseous fluid, relative to a migration up-structure within the reservoir.

As will be apparent to those skilled in the art, the present in situ heating and gas generating procedure can be uniquely advantageous in tending to shorten the migration time by thermally mobilizing both the reservoir oil and the injected or generated gas—in substantially any reservoir in which any upward gas-migration is physically possible.

After allowing the reservoir to be heated and the gas to migrate toward its top, oil-containing fluid is produced. Where the reservoir oil overlies an active acquifer or is subject to a water drive, the rate of oil production is preferably relatively gradually increased and, to the extent feasible, limited to a rate which is low enough to minimize a rapid coning of water into the production location.

SUITABLE COMPOSITIONS AND PROCEDURES

Suitable nitrogen-containing gas-forming reactants for use in the present process can comprise water-soluble amino nitrogen-containing compounds which contain at least one nitrogen atom to which at least one hydrogen atom is attached and are capable of reacting with an oxidizing agent to yield nitrogen gas within an aqueous medium. Such water-soluble nitrogen-containing compounds can include ammonium salts of organic or inorganic acids, amines, and/or nitrogen-linked hydrocarbon-radical substituted homologs of such compounds, as long as they react with an oxidizing agent to produce nitrogen gas and byproducts which are liquid or dissolve in water to form liquids which are substantially inert relative to the well conduits and reservoir formations. Examples of such nitrogen-containing compounds include ammonium chloride, ammonium nitrate, ammonium nitrite, ammonium acetate, ammonium formate, ethylene diamine, formamide, acetamide, urea, benzyl urea, butyl urea, hydrazine, phenylhydrazine, phenylhydrazine hydrochloride, and the like. Such ammonium salts, e.g., ammonium chloride, ammonium formate or ammonium nitrate are particularly suitable.

Oxidizing agents suitable for use in the present process can comprise substantially any water-soluble oxidizing agents capable of reacting with a water-soluble nitrogen-containing compound of the type described above to produce nitrogen gas and the indicated types of by-products. Examples of such oxidizing agents include alkali metal hypochlorites (which can, of course, be formed by injecting chlorine gas into a stream of alkaline liquid being injected into the well), alkali metal or ammonium salts of nitrous acid such as sodium or potassium or ammonium nitrite, and the like. The alkali metal or ammonium nitrites are particularly suitable for use with nitrogen-containing compounds such as the ammonium salts. Since the reaction can occur between ammonium ions and nitrite ions, ammnium nitrite is uniquely capable of providing both the nitrogen-containing and oxidizing reactants in a single compound that is very soluble in water.

Aqueous liquids suitable for use in the present invention can comprise substantially any in which the salt content does not (e.g. by a common ion effect) prevent the dissolving of the desired proportions of N-containing and oxidizing reactants. In general, any relatively soft fresh water or brine can be used. Such aqueous liquid solutions preferably have a dissolved salt content of less than about 1000 ppm monovalent salts and less than about 100 ppm multivalent salts.

Alkaline buffer compounds of systems suitable for initially retarding the rate of gas generation can comprise substantially any water-soluble buffer which is compatible with the gas-forming components and their products and tends to maintain the pH of an aqueous solution at a value of at least about 7. Examples of suitable buffering materials include the alkali metal and ammonium salts of acids such as carbonic, formic, acetic, citric, and the like, acids.

As will be apparent to those skilled in the art, the concentrations at which the individual amino nitrogen-containing and oxidizing agent-containing solutions can be combined to form the nitrogen-gas-generating solution, can be varied to suit the solubility properties and-/or other properties or functions of the compounds containing those ions and the proportions in which such solutions are to be combined. For example, if the nitrogen-containing compound is the least soluble compound, it can be dissolved at a molarity less than twice the molarity selected for the treating solution and then mixed, in a greater than equal proportion, with a smaller than equal proportion of a more concentrated solution of the more soluble compound, in order to combine the reactants in stoichiometric proportion. Of course, in various situations, at less than, or greater than stoichiometric molecular proportion of the less soluble or more desirable reactant or reactant-containing compound, can be combined with an excess or deficiency of the more soluble or less desirable reactant.

The rate at which such a gas generating and heating solution is injected into the well can be continuous or intermittent or can be varied substantially as desired as long as the rate of injection is correlated with the rate of the reaction within the treating solution, in the manner as described above. For example, a first portion of the treating solution can be injected and stopped in order to heat up a selected portion of the well or reservoir and/or the concentration of the reactants and/or rate at which the reactants react can be varied in order to impart more or less heat at a selection location within the well or reservoir.

For example, where a water-cone has invaded the perforated interval, the nitrogen-gas-generating solution can advantageously be made relatively concentrated in dissolved solid reactants and/or inert salts, so that its density is significantly greater than that of the water in the invaded zone. The so-arranged solution is preferably injected through some or all production well openings into the invaded zone. This tends to miscibly displace the invading water and preform a solution gas drive within the reservoir rock pores within that region. Such a high density solution can be formulated as described in the patent application Ser. No. 307,035, arranged to be relatively slowly reactive at the reservoir temperature and injected relatively slowly to enhance its tendency to sink below the reservoir fluids and permeate the water cone-invaded zone with pores at a residual water saturation to gas—to increase the resistance of such pores to the re-entry of water.

In general, the determinations of the currently existing properties such as the temperature or volume or injectivity of the well or reservoir to be treated can be conducted or ascertained by logging or measuring procedures such as those currently available and/or by previous experience in the same or an adjacent well. The temperatures provided by the present heating procedure at a particular downhole location can be monitored during the treatment by means of conventional tools and, at least to some extent, such temperatures can be varied by varying the rate at which the nitrogen-gas-generating solution is injected.

What is claimed is:

1. A process for treating a subterranean oil reservoir which contains oil in a location between the top of the reservoir and the uppermost opening into a well encountering the reservoir, comprising:

injecting into the reservoir fluid which comprises or contains an aqueous solution of nitrogen-gas-generating reactants with those reactants arranged to generate a significant amount of nitrogen gas and heat at the reservoir temperature;

said injected fluid having a composition arranged to be, or to become, predominantly gaseous within the reservoir at the temperature to which the reservoir is heated by the nitrogen-gas-generating reaction; and keeping the injected fluid substantially static within the reservoir for a time sufficient for the generation of a significant amount of nitrogen gas and a migration of at least a significant proportion of gas to a location within the reservoir above said uppermost opening into the well.

2. The process of claim 1 in which oil is recovered by producing fluid which is displaced toward a production location by a gas cap drive.

3. The process of claim 1 in which at least a portion of the injected fluid is a gas or a liquid which is a vapor at the temperature to which the reservoir is heated by the nitrogen-gas-generating reaction within the reservoir.

4. The process of claim 1 in which the reservoir oil viscosity and vertical permeability properties of the reservoir are such that the upward migration of a slug of injected natural gas is undesirably slow at the reservoir temperature.

5. The process of claim 1 in which at least a portion of the injected fluid is a normally gaseous hydrocarbon.

6. The process of claim 1 in which a portion of the injected fluid is a liquid hydrocarbon or a mixture of hydrocarbons which becomes substantially gaseous at the pressure and temperature developed within the reservoir by the nitrogen-gas-generating reaction within the reservoir.

7. The process of claim 1 in which at least a portion of the injected fluid consists essentially of $CO_2$.

* * * * *